(12) United States Patent
Lavertu et al.

(10) Patent No.: US 12,247,524 B2
(45) Date of Patent: Mar. 11, 2025

(54) VEHICLE CONTROL SYSTEM AND METHOD

(71) Applicant: Transportation IP Holdings, LLC, Norwalk, CT (US)

(72) Inventors: Thomas Michael Lavertu, Ballston Lake, NY (US); Adam Edgar Klingbeil, Ballston Lake, NY (US); Eric Dillen, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/150,498

(22) Filed: Jan. 5, 2023

(65) Prior Publication Data

US 2023/0235708 A1    Jul. 27, 2023

Related U.S. Application Data

(60) Provisional application No. 63/303,151, filed on Jan. 26, 2022.

(51) Int. Cl.
*F02D 19/08*    (2006.01)
*G01C 21/34*    (2006.01)

(52) U.S. Cl.
CPC ....... *F02D 19/081* (2013.01); *G01C 21/3469* (2013.01); *F02D 2250/00* (2013.01)

(58) Field of Classification Search
CPC .............. F02D 2250/00; F02D 19/081; G01C 21/3469
See application file for complete search history.

(56) References Cited

U.S. PATENT DOCUMENTS

| | | | |
|---|---|---|---|
| 2011/0257869 A1* | 10/2011 | Kumar | B61L 25/025 701/103 |
| 2016/0059872 A1 | 3/2016 | Kumar et al. | |
| 2020/0139993 A1 | 5/2020 | Fisher | |
| 2020/0393258 A1* | 12/2020 | Leone | G01C 21/3492 |
| 2021/0222652 A1* | 7/2021 | Groth | F02M 31/205 |
| 2021/0310430 A1 | 10/2021 | Fisher et al. | |

FOREIGN PATENT DOCUMENTS

EP    2336529 A2    6/2011

OTHER PUBLICATIONS

Extended European Search Report for corresponding EP Application No. 23151468.8 dated Jun. 26, 2023 (8 pages).

* cited by examiner

*Primary Examiner* — Kevin A Lathers
(74) *Attorney, Agent, or Firm* — K&L Gates LLP (57) ABSTRACT

A vehicle control system and a method of operating thereof may include determining a first ratio at which to operate a vehicle system at a first location along a route along which the vehicle system moves. The first ratio may be based on an amount of a first fuel of a first fuel source relative to an amount of a second fuel of a second fuel source. The vehicle system may be powered by one or more of the first or the second fuel sources. First operational settings at which to control the vehicle system may be determined based on the first ratio between the first and second fuel sources at the first location along the route. Operation of the vehicle system may be controlled according to the first operational settings to move the vehicle system according to the first ratio at the first location along the route.

25 Claims, 7 Drawing Sheets

VEHICLE CONTROL SYSTEM AND METHOD

CROSS-REFERENCE TO RELATED APPLICATION

This application claims priority to U.S. Provisional Application No. 63/303,151 (filed 26 Jan. 2022), the entirety of which is incorporated herein by reference.

BACKGROUND

Discussion of Art

The subject matter described herein relates to vehicle control systems and methods.

Discussion of the Art

Multi-fuel engines may be powered by different types of fuel, such as carbon-based fuel (e.g., diesel, gasoline, or the like) and non-carbon-based fuels (e.g., hydrogen, ammonia, or the like). The different amounts of each of the different types of fuel may be based on a power notch setting of the vehicle system. For example, at a first notch setting, the engine may be powered by a first ratio of the first fuel relative to the second fuel, and at a second power notch setting, the engine may be powered by a second ratio of the first fuel relative to the second fuel. The ratio between the first and second fuels may change responsive to the power notch setting of the vehicle system changing. The engine may be powered by the predetermined ratios corresponding to the power notch settings while the vehicle system moves along a route for a trip, and the predetermined ratios may be defined across plural operating routes.

The predetermined ratios that correspond with the power notch settings do not, however, optimize the use of the different types of fuel available to power the engine. For example, the multi-fuel engine may be less efficient (e.g., may consume more of the carbon-based fuel) at a lower power notch setting relative to being more efficient at a higher power notch setting. The predetermined ratios, however, fail to consider the alternative non-carbon-based fuel, and alternative ratios based on efficiencies of the engine at different power levels. For example, the engine may generate an unnecessary amount of $CO_2$ emissions, rather than optimize the use of the alternative non-carbon-based fuel, based on the predetermined fixed ratios.

It may be desirable to have a system and method that differs from those that are currently available.

BRIEF DESCRIPTION

In accordance with one example or aspect, a method may include determining a first ratio at which to operate a vehicle system at a first location along a route along which the vehicle system moves. The first ratio may be based on an amount of a first fuel of a first fuel source relative to an amount of a second fuel of a second fuel source. The vehicle system may be powered by one or more of the first fuel source or the second fuel source. First operational settings at which to control the vehicle system may be determined based on the first ratio between the first fuel source and the second fuel source at the first location along the route. Operation of the vehicle system may be controlled according to the first operational settings to move the vehicle system according to the first ratio at the first location along the route.

In accordance with one example or aspect, a system may include a controller having one or more processors that may determine a first ratio at which to operate a vehicle system at a first location along a route. The first ratio may be based on an amount of a first fuel of a first fuel source and an amount of a second fuel of a second fuel source. The vehicle system may be powered by one or more of the first fuel source or the second fuel source. The controller may determine first operational settings at which to control the vehicle system based on the first ratio between the first fuel source and the second fuel source at the first location along the route. The controller may communicate a command message to the vehicle system to control operation of the vehicle system according to the first operational settings to move the vehicle system according to the first ratio at the first location along the route.

In accordance with one example or aspect, a method may include determining a variable ratio at which to operate a vehicle system at one or more locations along a route. The variable ratio may be based on an amount of a first fuel of a first fuel source relative to an amount of a second fuel of a second fuel source. The vehicle system may be powered by one or more of the first fuel of the first fuel source or the second fuel of the second fuel source. Variable operational settings at which to control the vehicle system may be determined based on the variable ratio at the one or more locations along the route. The vehicle system may be controlled according to first operational settings at a first location of the one or more locations along the route based on a first ratio of the variable ratio between the amount of the first fuel of the first fuel source relative to the amount of the second fuel of the second fuel source. The vehicle system may be controlled according to different, second operational settings at a second location of the one or more locations along the route based on a different, second ratio of the variable ratio between the amount of the first fuel of the first fuel source relative to the amount of the second fuel of the second fuel source. Operation of the vehicle system may be controlled according to the variable operational settings to move the vehicle system according to the variable ratio at the one or more locations along the route.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to a vehicle control system and method of operation. The vehicle control system may be used to control operation of a vehicle system that includes a multiple or multi-fuel engine. For example, the engine may be powered by a first fuel from a first fuel source, powered by a second fuel of a second fuel source, and/or powered by a combination of the first fuel and the second fuel. In one embodiment, the first fuel may be a carbon-based fuel, and the second fuel may be a non-carbon based fuel. The first and second fuel sources may be disposed onboard the vehicle system, may be disposed on different vehicles of a multi-vehicle system, or the like.

With regard to the fuel, the fuel may be a single fuel type in one embodiment and in other embodiments the fuel may be a mixture of a plurality of different fuels. In one example of a fuel mixture, a first fuel may be liquid and a second fuel may be gaseous. A suitable liquid fuel may be diesel (regular, biodiesel, HDRD, and the like), gasoline, kerosene, dimethyl ether (DME), alcohol, and the like. A suitable gaseous fuel may be natural gas (methane) or a short chain hydrocarbon, hydrogen, ammonia, and the like. In one embodiment, fuel may be inclusive of stored energy as used herein. In that perspective, a battery state of charge, or a source of compressed gas, a flywheel, fuel cell, and other types of non-traditional fuel sources may be included.

The vehicle system may include a controller that may determine a ratio based on an amount of the first fuel and an amount of the second fuel at which to operate the vehicle system. In one embodiment, the ratio may change or vary at different times of operation of the vehicle system, at different locations along the route, at different power requirements of the engine, or the like. The controller may determine different ratios and different power levels (e.g., operational settings) across a trip for the vehicle system for the multi-fuel engine being powered by the one or more different types of fuels. The different ratios may be determined across the entire trip or a portion of the trip of the vehicle system to control carbon emissions, such as carbon dioxide ($CO_2$) emissions, that may be generated by the engine. Optionally, the different ratios may be determined to control an amount of the first fuel (e.g., the carbon-based fuel) that is provided into the engine and supplied to a cylinder of the engine. In one or more embodiments, the different ratios may be determined based on different efficiency operating points of the engine. For example, the engine may be less efficient (e.g., consume an increased amount of the carbon-based fuel) while operating at a lower power level relative to operating at a higher power level.

While one or more embodiments are described in connection with a rail vehicle system, not all embodiments are limited to rail vehicle systems. Unless expressly disclaimed or stated otherwise, the subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle groups may be referred to as a convoy, consist, swarm, fleet, platoon, and train.

Figure 1:
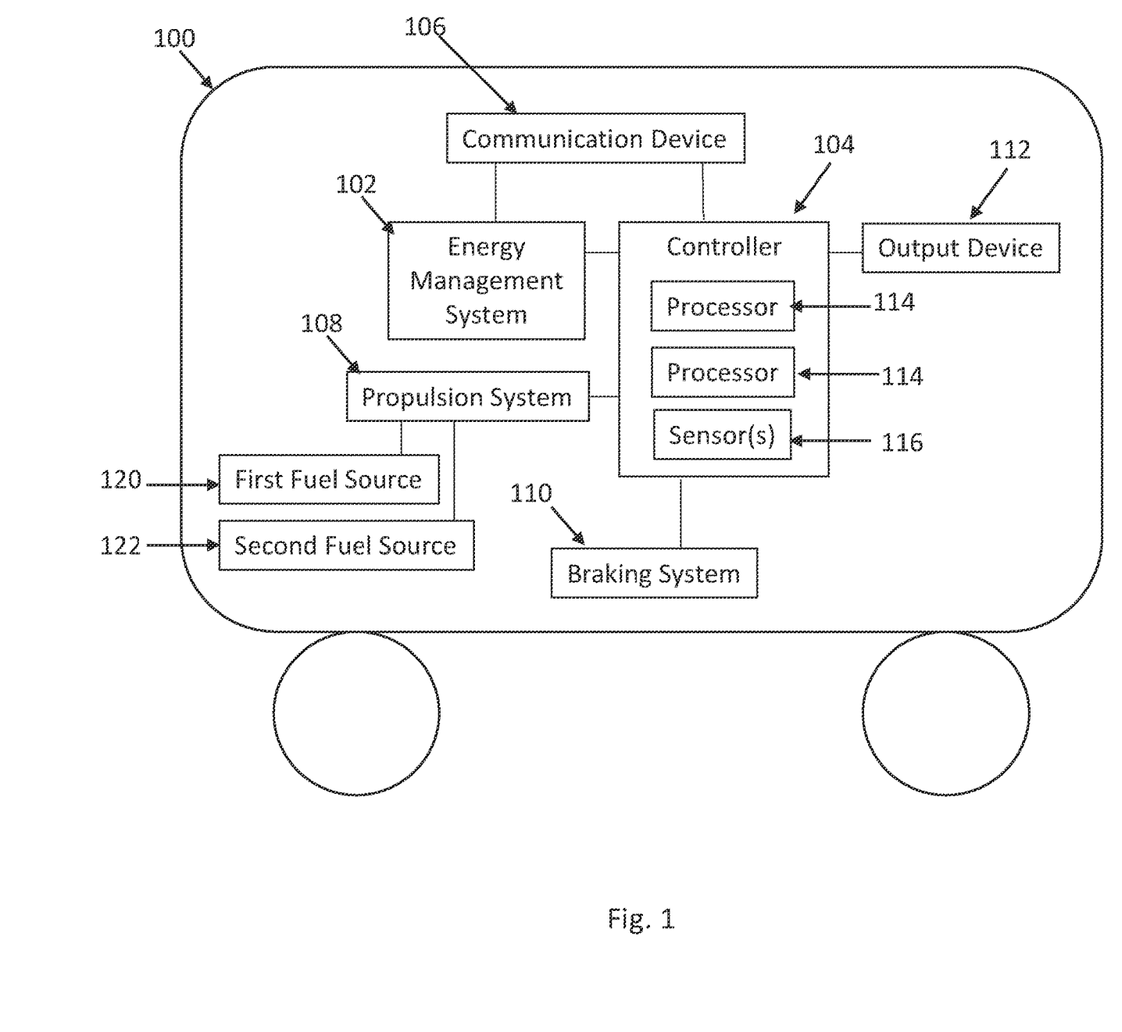
FIG. 1 illustrates a schematic of a vehicle system in accordance with one embodiment.

FIG. 1 illustrates one embodiment of a vehicle system 100 in accordance with one embodiment. The vehicle may include a controller 104 that represents hardware circuitry that includes and/or may be connected with one or more processors 114 (e.g., one or more integrated circuits, one or more microprocessors, one or more field programmable gate arrays, etc.) that perform and/or control performance of the operations described herein. The controller may also include or be electrically coupled to one or more sensors 116. The one or more sensors may be speed sensors, propulsion based sensors, braking system based sensors, motion sensors, fuel level sensors, global positioning system based sensors, etc. that may be used to determine speed data and information, data and information related to determining fuel and/or fuel components, data and information related to throttle settings, braking settings, or notch settings, or the like.

The controller may be communicatively coupled with an off-board control system (not shown) or one or more communication systems via a communication device 106. The communication device represents communication circuitry, such as one or more antennas, modems, or the like, that wirelessly communicate signals.

The controller may generate and communicate signals to an output device 112 (e.g., a display), to a propulsion system 108, and/or to a braking system 110 of the vehicle system. The signals can be sent to the output device to present instructions or rule to an operator on how to control the vehicle according to a trip plan. The signals may be sent to the propulsion system (e.g., one or more engines, motors, or the like) and/or the braking system to allow the controller to automatically control operation of the movement of the vehicle.

In one or more embodiments, the trip plan may designate one or more operational settings for the vehicle system to implement or execute during the trip as a function of distance, time, and/or location along the route. The operational settings may include tractive and/or braking efforts for the vehicle system. For example, the operational settings may dictate different speeds, throttle settings, brake settings, accelerations, or the like, of the vehicle system for different locations, times, and/or distances along the route traversed by the vehicle system. The trip plan may be determined by the controller onboard the vehicle system, a controller of an off-board control system, or the like. In one embodiment, the trip plan may be determined before the vehicle system starts a trip moving along the route (e.g., towards a destination location). In another embodiment, the trip plan may be determined before the vehicle system starts the trip, but may be adjusted or modified while the vehicle system moves along the route. For example, the trip plan may be modified based on one or more unexpected conditions or characteristics of the route, ambient conditions, other vehicle congestion, or the like.

The vehicle system may include one or more sources of one or more different types of fuel. The different types of fuel may be used to power an engine and/or other systems of the vehicle system. In one or more embodiments, the vehicle system may be referred to as a multi-fuel vehicle, such that the engine of the vehicle system may be a multi-fuel engine. For example, the multi-fuel vehicle may include plural different fuel sources disposed onboard the vehicle that supply different types of fuel to the multi-fuel engine to power the engine. The vehicle system may include a first fuel source 120 that may hold or contain a first fuel, and the vehicle system may include a second fuel source 122 that may hold or contain a second fuel. The first fuel may be liquid and/or gaseous fuels such as, but not limited to, diesel, gasoline, alcohol, kerosene, dimethyl ether. The second fuel may be liquid and/or gaseous fuels such as, but not limited to, natural gas, synthetic gas, hydrogen, ammonia, or the like. For example, the first fuel may be a carbon-based fuel source, and the second fuel may be a low-carbon or non-carbon based fuel source. Optionally, one or more of the first or second fuels may be ethanol, methanol, methane, or the like. In one example, the first fuel may generate an amount or volume of carbon dioxide ($CO_2$) emissions that is greater than an amount of $CO_2$ emissions generated by the second fuel source while the vehicle system uses at least a portion of the first fuel to power the vehicle system.

The vehicle system is illustrated as a land-based vehicle, such as an automobile, rail vehicle, mining vehicle, agricultural vehicle, or other off-highway vehicle, but optionally can represent another type of vehicle, such as a marine vessel or an aircraft. The vehicle system is shown as a single vehicle, but may be formed from several vehicles mechanically and/or logically coupled with each other. Mechanically coupled vehicles can travel together as a vehicle system while the vehicles are connected with each other (e.g., by a coupler, trailer hitch, etc.). Logically coupled vehicles can travel together as a vehicle system by communicating with each other to coordinate the movements of the individual vehicles so that the vehicles move as a group. A vehicle system may be formed from two or more vehicles that are logically, but not mechanically, coupled with each other.

Figure 2:
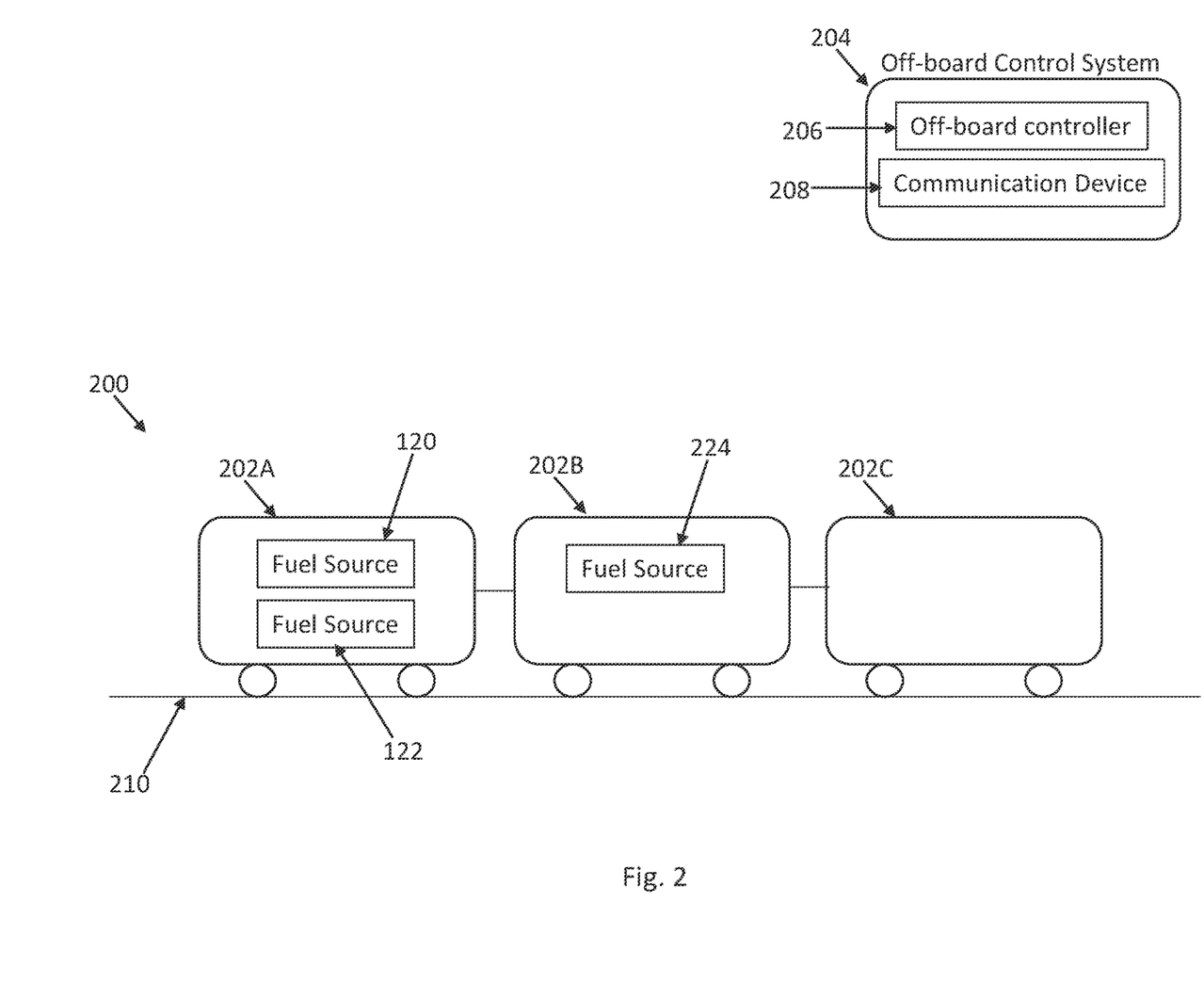
FIG. 2 illustrates a schematic of a vehicle system in accordance with one embodiment.

As one example, FIG. 2 illustrates one example of a vehicle system 200 that includes plural vehicles 202A, 202B, 202C mechanically coupled together that may move along a route 210. In one embodiment, the vehicle 202A may represent the vehicle system 100 illustrated in FIG. 1. One or more of the vehicles may be propulsion-generating vehicles that may provide propulsive efforts to move the propulsion-generating vehicles and non-propulsion-generating vehicles coupled thereto along the route.

The vehicle system may be communicatively coupled with an off-board control system 204. The off-board control system may include a controller 206 that can represent hardware circuitry that includes and/or is connected with one or more processors that perform operations of the off-board control system. In one embodiment, the off-board control system may communicate with the vehicle system via a communication device 208 to control and/or restrict movement of the vehicle system. For example, the off-board control system may communicate with the onboard controller of the vehicle system to notify the vehicle system where the vehicle system is allowed to travel, how fast the vehicle system is allowed to travel, how one or more engines of the vehicle system are to be powered (e.g., by different amounts of the first fuel and the second fuel), or the like.

In one embodiment, the off-board control system may represent a back-office server of a positive vehicle control (PVC) system. A PVC system is a control system in which a vehicle system is allowed to move, and/or is allowed to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is opposed to 'negative' vehicle control systems where a vehicle system is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board control system represents another computerized system that communicates with vehicle systems described herein.

In one or more embodiments, the vehicle system may be powered by different fuel sources disposed on different vehicles of the vehicle system. For example, as illustrated in FIG. 2, the first vehicle 202A may include the first fuel source and the second fuel source. Additionally, the second vehicle 202B may include a third fuel source 224. Two or more of the fuel sources may hold or contain the same type of fuel. For example, the first and third fuel sources may both contain the first fuel (e.g., diesel, gasoline, or the like), and the second fuel source may contain the second fuel. The plural different fuel sources may be fluidly coupled with one or more engines of the vehicle system and may provide fuel to power the one or more engines. In one example, the first and second fuel sources disposed on the first vehicle may provide fuel to power a first engine disposed on the first vehicle, and the third fuel source disposed on the second vehicle may provide fuel to power a second engine disposed on the second vehicle.

Returning to FIG. 1, different amounts of the different types of fuels may be used to power the multi-fuel engine (and/or other systems of the vehicle system). The different amounts of the different types of fuel may be based on one or more different conditions of the route (e.g., topographical characteristics, weather conditions, congestion conditions, or the like), conditions of the engine (e.g., age, type, time since repair, maintenance or cleaning, power requirements of the engine, or the like), conditions of the vehicle system (e.g., a size of the vehicle system such as length, weight, or the like), or the like. The vehicle system may include an energy management system 102 that may represent same or different hardware circuitry that includes and/or may be connected with the same or different one or more processors as the controller.

The energy management system may be configured to make determinations related to the different amounts of the first and/or second fuels that may be used to power the vehicle system. The energy management system may generate and/or modify a trip plan of the vehicle system that indicates how much of the first and/or second fuels that may be used to operate the vehicle system at different locations along the route. For example, the vehicle system may be powered by one or both of the first fuel of the first fuel source or the second fuel of the second fuel source. The energy management system may determine different ratios between the first and second fuels at which to operate the vehicle system, where the different ratios are based on different amounts of the first fuel of the first fuel source relative to amounts of the second fuel of the second fuel source. Optionally, the energy management system may determine different operational settings for controlling operation of the vehicle system based on the different ratios.

The energy management system may determine a substitution rate indicating different amounts of the different fuel sources that may be used to power the vehicle system. In one embodiment, the substitution rate may be referred to as an amount of the second fuel (e.g., hydrogen, ammonia, or the like) and be defined as the energy content of the second fuel divided by the total energy counted for all the fuel. For example, an 80% substitution rate may indicate that about 80% (e.g., within 1%, 2%, 10%, or the like) of the energy to power the vehicle system is from the second fuel (e.g., hydrogen, ammonia, or the like) and about 20% of the energy is from the first fuel (e.g., diesel, gasoline, alcohol, kerosene, dimethyl ether, or the like). As another example, a about 50% substitution rate may indicate that 50% of the energy is from the second fuel, and about 50% of the energy is from the first fuel. As another example, a 100% substitution rate may indicate that about 100% of the energy to power the vehicle system is from the second fuel and about 0% is from the first fuel.

In one embodiment, the energy management system may determine the substitution rate and/or operational settings for operating the vehicle system (e.g., power settings, propulsion settings, brake settings or the like) prior to the vehicle system starting movement along the route. In another embodiment, the energy management system may dynamically determine the substitution rate as the vehicle system is moving along the route. Optionally, the off-board control system (shown in FIG. 2) may determine the substitution rate and power level across the trip for the vehicle system and may communicate the substitution rate and power level to the energy management system via the communication device of the off-board control system. In one embodiment, the energy management system may start a trip with the vehicle system with known substitution rates at different locations along the route, and may optionally change the substitution rate as the vehicle system moves along the route. The rate may be changed as the vehicle system moves along the route based on weather conditions, vehicle congestion, object and/or pedestrian congestion, additional vehicles being added to or decoupled from the vehicle system, different cargo being carried than what was expected, or the like.

In one or more embodiments, the substitution rate may indicate a ratio at which to operate the vehicle system. The ratio may be based on an amount of the first fuel of the first fuel source relative to an amount of the second fuel of the second fuel source. In one embodiment, the energy management system and/or the off-board control system may determine the trip plan by determining different ratios of the first fuel relative to the second fuel for different locations along the route. For example, a first location along the route may include a decline in the route (e.g., relative to a horizontal) and a first ratio may be determined based on the topographical characteristics of the first location. The first ratio may be based on an amount of the first fuel of the first fuel source relative to an amount of the second fuel of the second fuel source. Optionally, the first ratio may be determined in order to control usage of the first fuel and usage of the second fuel based on the one or more characteristics of the route along which the vehicle system moves. Alternatively, a second location along the route may include an incline in the route, and a second ratio may be determined based on the topographical characteristics of the second location. The first ratio (e.g., of the first fuel relative to the second fuel) may be the same or different than the second ratio.

The energy management system and/or the off-board control system may determine operational settings for controlling operation of the vehicle system based on the different ratios at which to power the vehicle system. For example, the propulsion system and braking system may be controlled according to first operational settings at the first location along the route based on the first ratio between different fuel sources. Additionally, the propulsion system and/or braking system may be controlled according to different, second operational settings at the second location along the route based on the second ratio between the different fuel sources.

In one embodiment, the energy management system and/or the controller may adjust the ratio between the first fuel relative to the second fuel in order to achieve a determined carbon content of the total fuel amount supplied into a cylinder of the engine of the vehicle system. In another embodiment, the energy management system and/or the controller may adjust the ratio of the first fuel relative to the second fuel to achieve a determined carbon content of the exhaust flow produced by the engine of the vehicle system during operation. For example, the ratio or substitution rate may be determined to control the first fuel (e.g., the carbon-based fuel) that is provided into the engine, and to control the carbon-content amount (e.g., carbon or $CO_2$ emissions) in the exhaust of the engine. Optionally, the ratio may be adjusted to control alternative types of emissions such as, but not limited to, a combination of nitrogen oxides (NOx), particulate matter (PM), hydrocarbons, carbon monoxide, carbon dioxide, or the like.

The substitution rate and different power levels of operating the vehicle system (e.g., propulsion notch levels, brake settings, or the like) may be planned for the vehicle system across the trip for the multi-fuel vehicle system. The substitution rate may be determined based on one or more factors, such as, but not limited to, to control $CO_2$ emissions generated by the engine of the vehicle system (e.g., by the vehicle system using the first fuel to power an engine of the vehicle system), based on the different amounts of the first fuel and the second fuel that may be available, based on an amount of power needed across the entire trip (e.g., from a first location to a second location or destination of the vehicle system along the route), based on different amounts of power needed at different locations along the route, based on the time of travel of the trip (e.g., the vehicle system may have to reach a destination by a determined time or within a timing window), or the like. In one embodiment, the vehicle system may travel through a section of the route that includes restrictions (e.g., an upper limit or maximum threshold amount) on the amount of $CO_2$ the vehicle system is allowed to expel within the section of the route. The substitution rate may be predetermined based on the restrictions of the section of the route to control the amount of carbon emissions emitted from the vehicle system.

In one embodiment, the vehicle system may be operated at a varying substitution rate based on available amounts of the first and second fuels, different engine set points, an engine efficiency at different engine set points, or a combination of two or more therein. As one example, at a more efficient operating point of the engine, the vehicle system may operate at a lower substitution rate to conserve the second fuel (e.g., hydrogen, ammonia, or the like) and use more of the first fuel (e.g., diesel, gasoline, or the like). As another example, the vehicle system may operate at a lower substitution rate based on an overall efficiency of the vehicle system. For example, the second fuel (e.g., the low or non-carbon fuel) may be conserved for the trip, which may be later used for another trip or another portion of the trip. The amount of carbon emissions may be higher or lower than the vehicle system operating at a higher substitution rate at a different overall efficiency of the vehicle system. As another example, the vehicle system may be controlled to operate at a higher substitution rate in order to reduce the amount of carbon emissions generated by the vehicle system. As another example, the vehicle system may be controlled to operate at a higher substitution rate based on an efficiency of the vehicle system at a particular condition (e.g., route condition, operating parameter conditions, or the like). For example, an efficiency of the vehicle system may be determined to be improved or better than an efficiency of the vehicle system operating according to other conditions or parameters. The substitution rate may be higher or increased based on the improved efficiency of the vehicle system (e.g., improved efficiency and/or improved carbon reduction). Optionally, the substitution rate may be determined based on other factors of the vehicle system, the route, requirements, restrictions, or the like.

Powering the engine at the lower substitution rate at the more efficient operating point of the engine may produce a reduced amount of carbon and/or $CO_2$ emissions relative to running at the lower substitution rate at a less efficient operating point. Alternatively, at a less efficient operating point of the engine, the engine may run at a higher substitution rate to conserve the first fuel, and use more of the second fuel. Powering the engine at the higher substitution rate at the less efficient operating point of the engine may produce a reduced amount of $CO_2$ emissions based on the reduced amount of the first fuel used to power the vehicle system.

Figure 3:
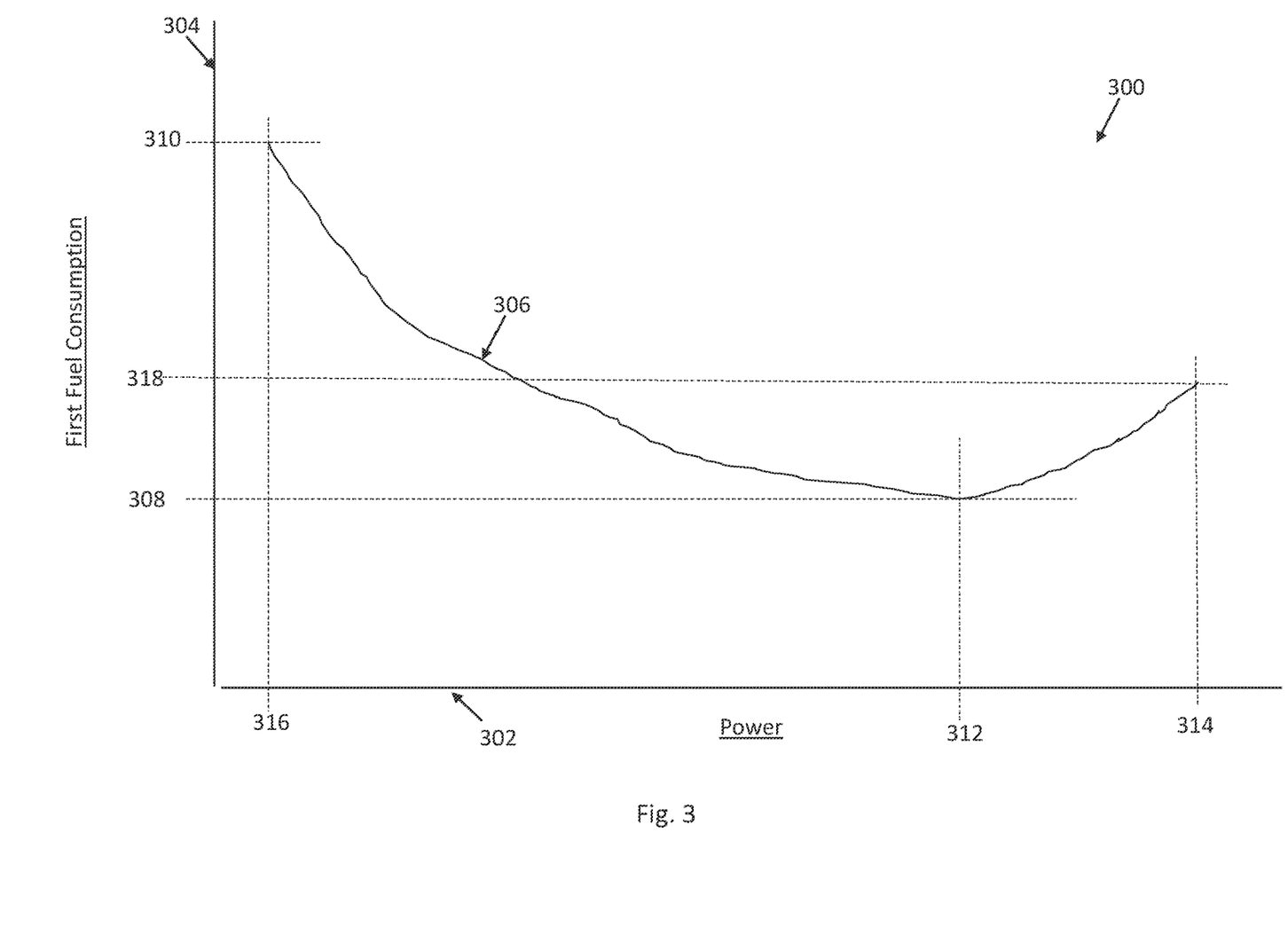
FIG. 3 illustrates one example of a graph of an engine efficiency at different power levels of operation of a vehicle system in accordance with one embodiment.

FIG. 4 illustrates a graph 300 of an engine efficiency at different power levels of operation of an engine of the vehicle system in accordance with one embodiment. The graph includes a horizontal axis 302 representative of increasing power of the engine, and a vertical axis 304 representative of increasing fuel consumption of the engine. A data line 306 indicates an amount of the first fuel (e.g., diesel, gasoline, or the like) that the engine may consume at increasing power levels of operation. The engine may consume the most amount of the first fuel 310 while the engine operates at a lowest power setting 316. For example, the engine is least efficient (e.g., consumes the most amount of the first fuel) while the engine operates at the lowest power setting. Alternatively, the engine has an improved efficiency and consumes a reduced amount of the first fuel 318 while the engine operates at the highest power setting 314. For example, the engine is least efficient while the engine operates at the lowest power setting. Although the engine consumes an increased amount of fuel while operating at the highest power setting, the engine consumes the increased amount of fuel in a manner that is more efficient than the efficiency of the engine operating at the lowest power setting. The engine may be most efficient (e.g., consume the least amount of the first fuel) while the engine operates at a reduced power setting 312, that is less than the highest power setting. The varying amounts of the first fuel being consumed by the engine may indicate an amount of $CO_2$ emissions the engine may generate responsive to the engine being powered by the first fuel.

The engine may be powered by a combination of the first fuel and the second fuel in order to control the efficiency of the engine (e.g., reduce the amount of $CO_2$ emissions the engine may generate). For example, the engine may be powered by different amounts of the first fuel and different amounts of the second fuel at different locations along the route, at different power levels of the engine, to control the efficiency of the engine, and to control an amount of the first fuel that the engine consumes. The different amounts of the first fuel and the different amounts of the second fuel may be based on the different ratios of the first fuel to the second fuel, and the substitution rate at which to power the vehicle system. The different ratios between the first fuel and the second fuel may be determined to control the amount of emissions generated by the engine being powered by the first fuel and/or the second fuel.

Figure 4:
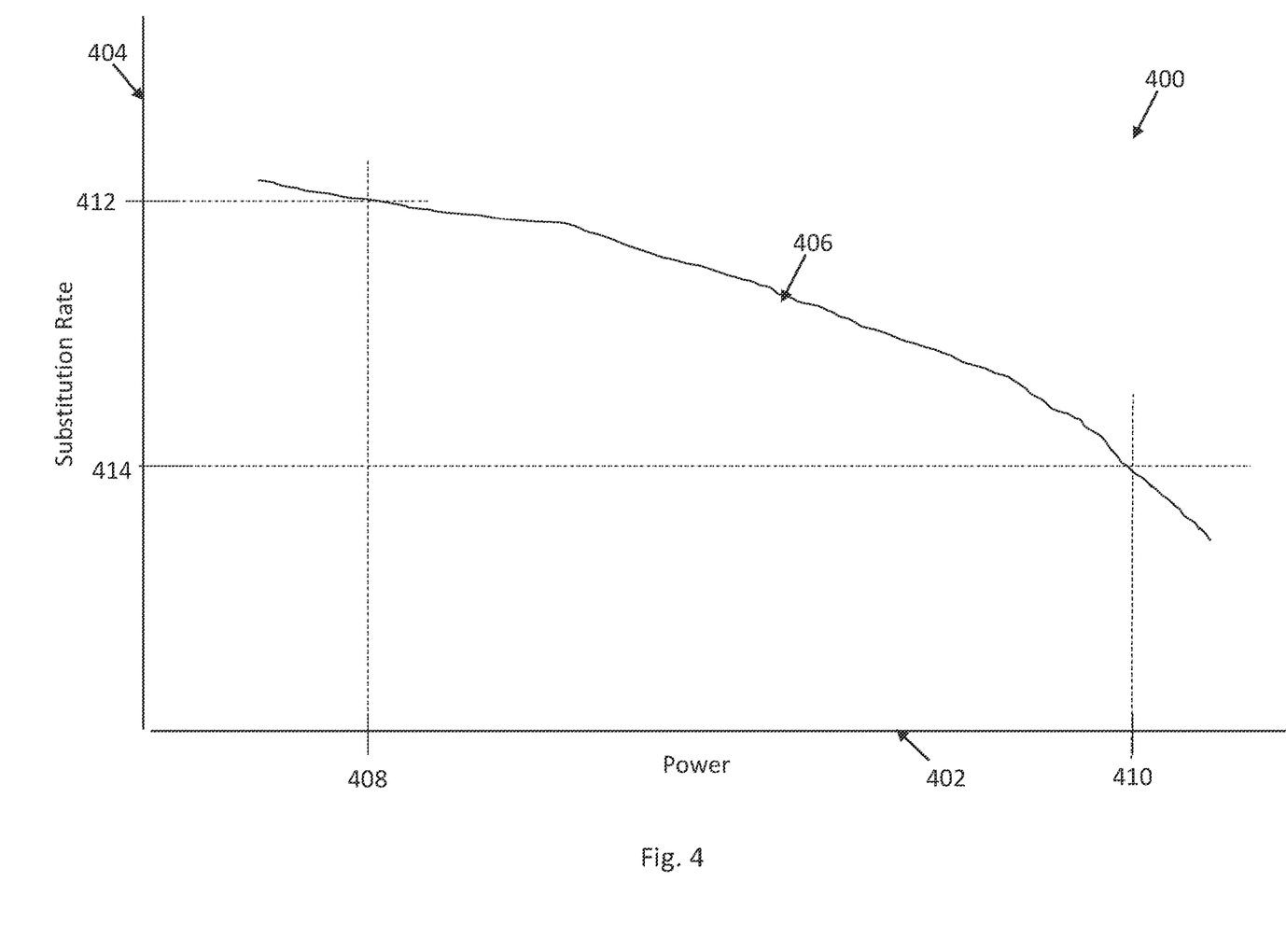
FIG. 4 illustrates one example of a graph of a substitution rate of a first fuel to a second fuel relative to power requirements of the vehicle system.

FIG. 4 illustrates a graph 400 of a substitution rate between the first fuel and the second fuel relative to power requirements of the vehicle system. The graph includes a horizontal axis 402 representative of increasing power of the engine, and a vertical axis 404 representative of a substitution rate, indicating an amount of the second fuel that may be used to power the vehicle system divided by the total energy from all fuel sources. A data line 406 indicates the substitution rate at different power levels. For example, the substitution rate may be higher (e.g., at point 412) while the engine power level requirement is lower (e.g., at point 408), and the substitution rate may be lower (e.g., at point 414) while the engine power level requirement is higher (e.g., at point 410). With reference to FIG. 3, while the engine is operating at a lower power setting, the engine is less efficient relative to the engine operating at a higher power setting. The substitution rate may be determined to be higher (e.g., more of the second fuel may be used to power the engine relative to the first fuel) to control the amount of emissions generated by the inefficient engine operating at the lower power level, and the substitution rate may be determined to be lower (e.g., less of the second fuel may be used to power the engine) while the engine operates at a more efficient power level.

Figure 5:
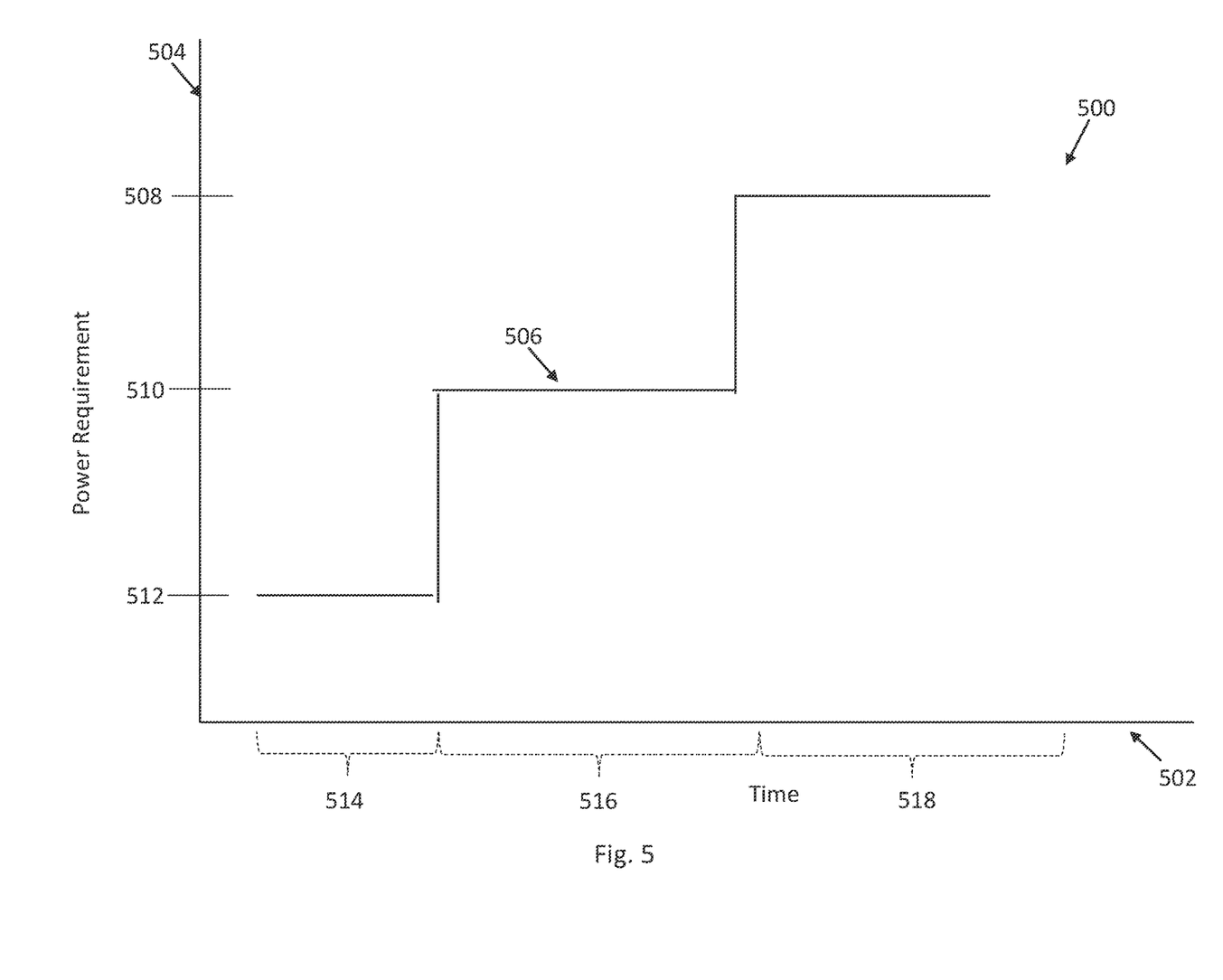
FIG. 5 illustrates one example of a graph of power requirements of a vehicle system over time of usage of the vehicle system.

FIG. 5 illustrates a graph 500 of power requirements of a vehicle system over time of usage of the vehicle system. The graph includes a horizontal axis 502 representative of time, and a vertical axis 504 representative of increasing power requirements of a vehicle system. The time may refer to a travel time (e.g., in seconds, minutes, hours, or the like) of the vehicle system, a time of operation of the vehicle system (e.g., stationary and/or moving), or the like. A data line 506 may indicate power requirements of the vehicle system at different times of operation of the vehicle system. In the illustrated embodiment, the vehicle system may have a first power requirement 512 for a first length of time 514, may have a second power requirement 510 that is greater than the first power requirement for a second length of time 516, and may have a third power requirement 508 that is greater than the first and second power requirements for a third length of time 518.

Figure 6:
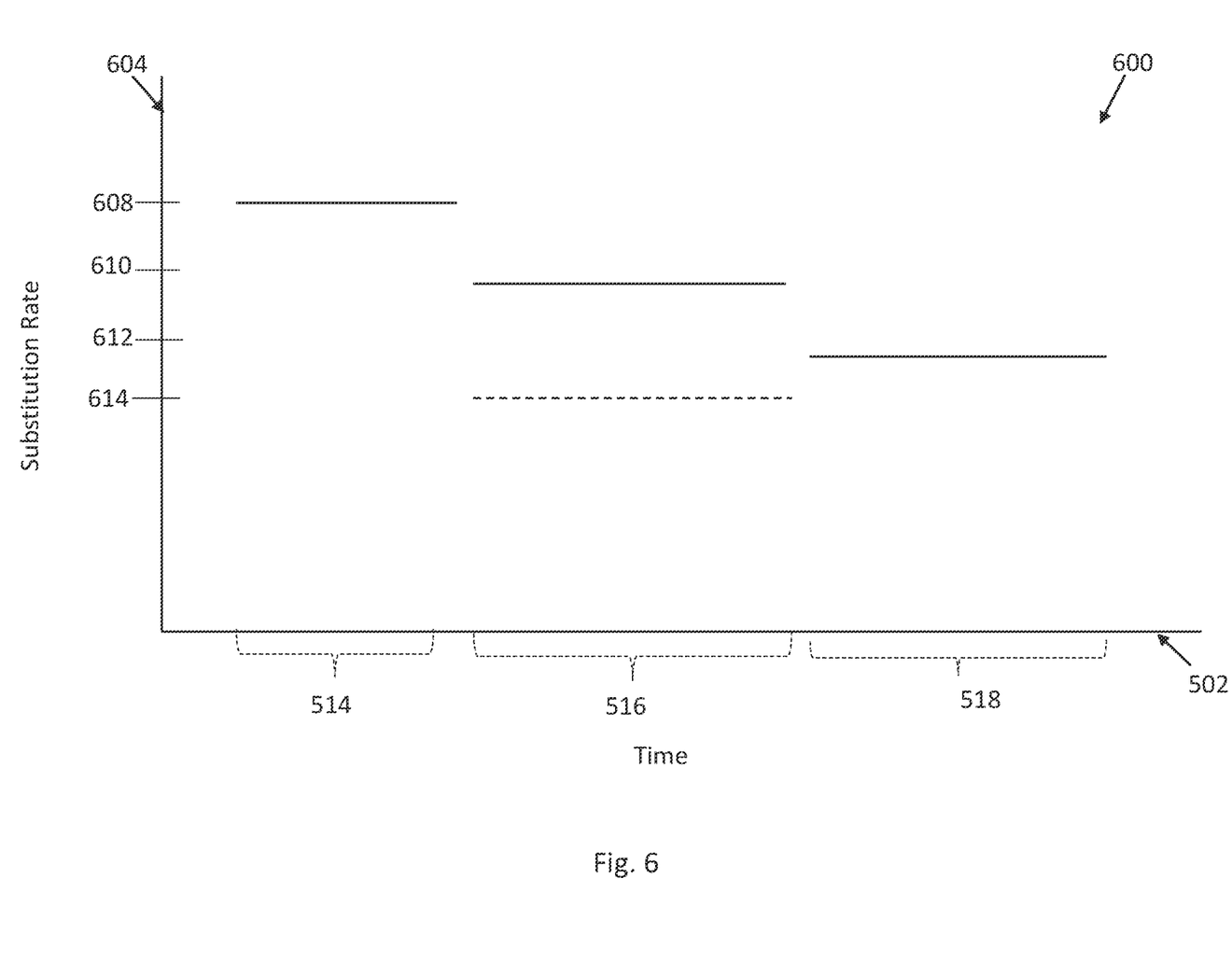
FIG. 6 illustrates one example of a graph of a substitution rate of a first fuel to a second fuel over time of usage of a vehicle system.

The substitution rate for operating the vehicle system with power from the first and second fuel sources may be based on the power requirements of the vehicle system, the different amounts of available first and second fuels, emission requirements, or the like. For example, FIG. 6 illustrates a graph 600 of one example of determined substitution rates for powering the engine of the vehicle system over time of usage of the vehicle system. The graph shown in FIG. 6 may correspond to the graph shown in FIG. 5. For example, the graph 600 includes the horizontal axis 502 representative of time, and a vertical axis 604 representative of increasing substitution rates. The vehicle system may be powered at a first substitution rate 608 for the first length of time 514 (e.g., while the power requirements are low, as shown in FIG. 5), may be powered at a second substitution rate 610 for the second length of time 516, and may be powered at a third substitution rate 612 for the third length of time 518 (e.g., while the power requirements are high, as shown in FIG. 5). For example, a variable ratio or variable substitution rate between the first fuel and the second fuel that may change at different locations along the route. The variable ratio or variable substitution rate may change based on the different locations along the route, different times of operation, different distances along the route, different power requirements of the vehicle system, or the like.

The first, second, and third substitution rates may be upper limit thresholds based on the power requirements of the vehicle system. For example, while the vehicle system is operating at the second power level (e.g., the second power requirement 510 shown in FIG. 5), the upper limit of the substitution rate may be the second substitution rate 610. In one or more embodiments, the vehicle system may be controlled to operate at substitution rates that may be lower than upper limit thresholds. For example, the substitution rate may be determined to be lower than an upper limit threshold at time when the engine may be more efficient, and the engine may be powered with more of the first fuel than what the upper limit threshold substitution rate would permit. Optionally, the substitution rate or ratio may be determined to be lower than the upper limit based on one or more objectives of a trip of the vehicle system, such as to control usage of the first fuel, control usage of the second fuel, or the like.

In one embodiment, the vehicle system may be powered for an alternative second substitution rate 614 for the second length of time that is lower than the second substitution rate 610. For example, the engine may operate at a lower substitution rate while the engine is operating at a more efficient power level. The engine may have an efficiency while operating according to first operational settings at the second substitution rate (e.g., at the rate 610), but the vehicle system may be able to be controlled according to different second operational settings at the alternative second substitution rate (e.g., at the rate 614) while the efficiency is substantially maintained based on the power requirements of the vehicle system. Optionally, the engine may run at the lower alternative second substitution rate to conserve the second fuel given that the engine has an improved efficiency (e.g., less fuel consumption of the first fuel) at the increased power level.

In one or more embodiments, the power setting of the vehicle system may be controlled to control the generation of carbon emissions. For example, the vehicle system may be controlled to operate at an alternative power setting to provide a reduced carbon emissions. The vehicle system may be controlled to operate at a higher substitution rate at a derated power level based on conditions or requirements of the trip (e.g., ambient conditions such as increased ambient temperature and humidity conditions, to reach a target substitution rate, or the like). Optionally, the vehicle system may be operated at an alternative power setting within a particular geographic region based on specific target amounts of emissions, geographic regulations within the region, or the like.

In one or more embodiments, the route plan of the vehicle system may be adjusted based on expected or anticipated ambient conditions (e.g., temperature, pressure, humidity, or the like). For example, if the vehicle system is expected to move within an area having a high altitude on a hot day, the substitution rate may be controlled based on the time of day in which the vehicle system is being operated. For example, the substitution rate may be increased during times of the day while the ambient temperature is lower (e.g., early morning, early evenings, overnight hours, or the like), and the substitution rate may be decreased during times of the day while the ambient temperature is higher. Alternatively, if the second fuel is ammonia, the substitution rate may be increased during times of the day while the ambient temperature is higher, and decreased during times of the day while the ambient temperature is lower. For example, the substitution rate may be adjusted based on a location of the vehicle system along the route, based on the time of day, based on the type of the first and/or second fuels, or the like.

Figure 7:
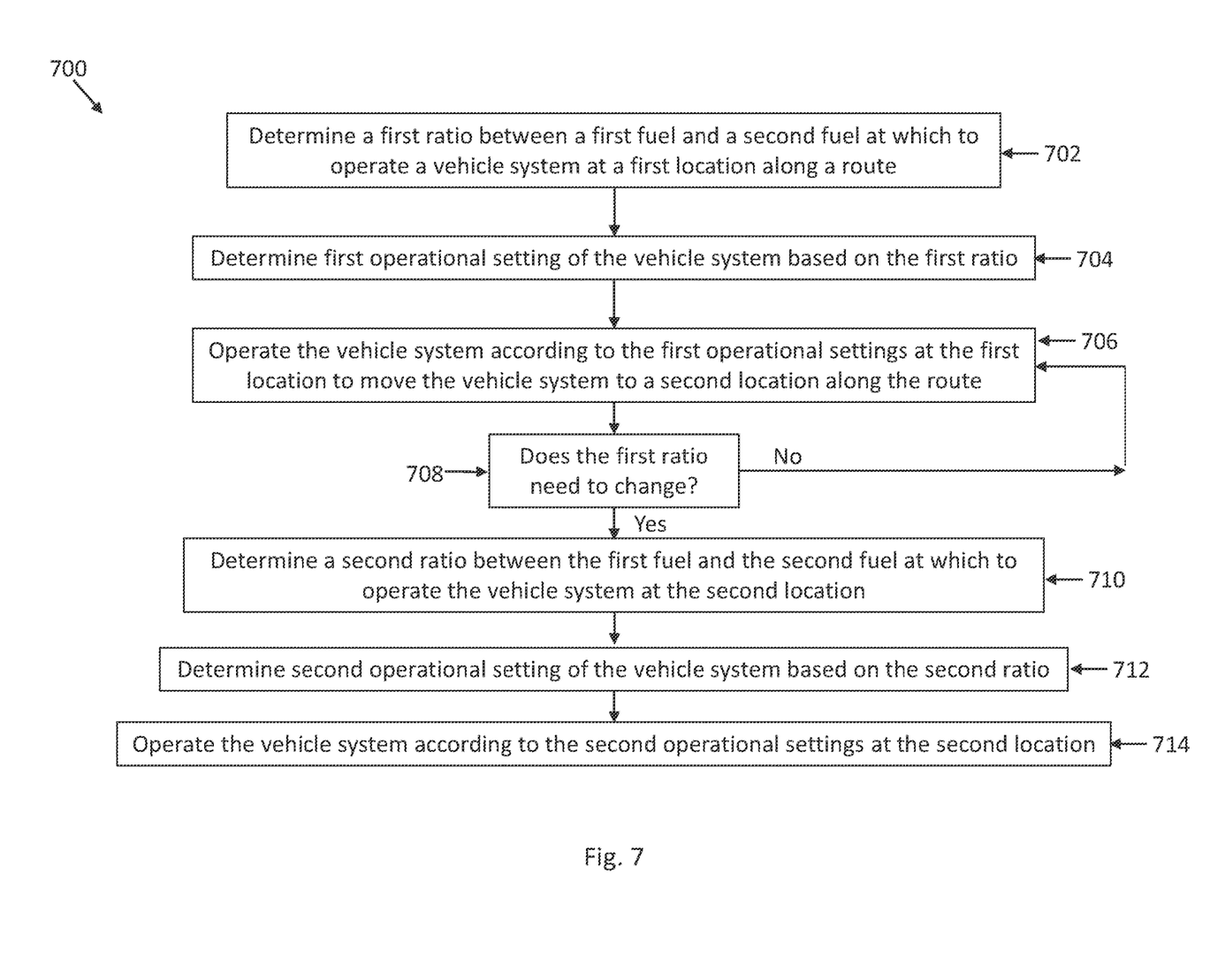
FIG. 7 illustrates a flowchart of a method of controlling operation of a vehicle system in accordance with one embodiment.

FIG. 7 illustrates one example of a flowchart 700 of a method of controlling operation of a vehicle system in accordance with one embodiment. At step 702, a first ratio of a first fuel relative to a second fuel may be determined for a first location along the route. The first ratio may indicate an amount of the first fuel relative to an amount of the second fuel that may be used to power an engine and/or systems of a vehicle system. For example, the engine may be a multi-fuel engine, such that the engine may be able to operate with the first fuel, the second fuel, or a combination of the first and second fuels. The first ratio may represent a substitution rate of the different fuels. As one example, a substitution rate of about 80% may indicate that about 80% of the energy to power the engine may be from the second fuel source (e.g., a non-carbon-based fuel), and about 20% of the energy to power the engine may be from the first fuel source (e.g., a carbon-based fuel). The first ratio may be determined based on available amounts of the first and second fuels, the power needed to propel the vehicle system, an engine efficiency, characteristics of the route, current weather conditions, or the like.

At step 704, first operational settings for controlling operation of the vehicle system may be determined based on the first ratio. For example, the first operational settings may indicate a propulsion notch setting, a brake setting, or the like, of the vehicle system. At step 706, the vehicle system may be operated according to the first operational settings while the vehicle system is at and/or within the first location along the route. The vehicle system may be controlled to operate according to the first operational settings while the vehicle is at or within the first location of the route, such as while the vehicle system moves toward a second location along the route.

At step 708, a determination is made whether the first ratio needs to change. As one example, the first ratio may need to change based on the vehicle system reaching the second location, and the second location having different route characteristics than the first location. As another example, the first ratio may need to change based on different power requirements for the vehicle system at or within the second location. As another example, the first ratio may need to change based on local governmental or other legal restrictions, such as a restriction in the amount of $CO_2$ emissions the vehicle system may emit while at or moving within the second location, noise ordinances, or the like. If the first ratio for powering the vehicle system does not need to change, flow of the method returns to step 706 and the vehicle may continue to operate according to the first operational settings. Alternatively, if the first ratio does need to change, flow of the method proceeds toward step 710.

At step 710, a second ratio between the first fuel and the second fuel at which to operate the vehicle system and power the engine at and/or within the second location may be determined. The second ratio may be different than the first ratio. For example, the first ratio or the first substitution rate may be about 80%, such that about 80% of the energy to power the engine is from the second fuel source, and about 20% of the energy to power the engine is from the first fuel source. The controller, the energy management system, and/or the off-board control system may determine a different, second ratio at which to power the engine of the vehicle system. For example, the second ratio or the second substitution rate may be about 50%, such that about 50% of the energy to power the engine is from the second fuel source, and about 50% of the energy to power the engine is from the first fuel source.

At step 712, second operational settings for controlling operation of the vehicle system may be determined based on the second ratio. The second operational settings may indicate a propulsion notch setting, a brake setting, or the like, of the vehicle system. The second operational settings, or a portion of the second operational settings, may be different or the same as the first operational settings. At step 714, the vehicle system may be operated according to the second operational settings while the vehicle system is at and/or moving within the second location.

In one or more embodiments, the controller and/or the energy management system may determine that the vehicle system may operate at a different ratio or substitution rate based on an efficiency of the engine of the vehicle system. For example, the second ratio may be a maximum or upper limit threshold of the substitution rate at a given power requirement of the engine. The controller may determine that the engine may operate at a substitution rate that is lower than the second ratio or second substitution rate at a more efficient operating point of the engine, such as to conserve the second fuel. For example, the controller may determine that the engine may operate according to a lower ratio (e.g., lower than the second ratio) while the efficiency of the engine is substantially maintained (e.g., within a threshold percentage, or the like). In one embodiment, the conserved second fuel may be stored within the second fuel source, and may be used at a less efficient operating point of the engine.

In one embodiment, the controller may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In accordance with one example or aspect, a method may include determining a first ratio at which to operate a vehicle system at a first location along a route along which the vehicle system moves. The first ratio may be based on an amount of a first fuel of a first fuel source relative to an amount of a second fuel of a second fuel source. The vehicle system may be powered by one or more of the first fuel source or the second fuel source. First operational settings at which to control the vehicle system may be determined based on the first ratio between the first fuel source and the second fuel source at the first location along the route. Operation of the vehicle system may be controlled according to the first operational settings to move the vehicle system according to the first ratio at the first location along the route.

Optionally, a second ratio between the first fuel source and the second fuel source at which to operate the vehicle system at a second location along the route may be determined. The first ratio between the amount of the first fuel of the first fuel source and the amount of the second fuel of the second fuel source may be different than the second ratio between the amount of the first fuel of the first fuel source and the amount of the second fuel of the second fuel source.

Optionally, the vehicle system may include two or more vehicles that travel together along the route. The first fuel source may be disposed onboard a first vehicle of the vehicle system, and the second fuel source may be disposed onboard a second vehicle of the vehicle system.

Optionally, a variable ratio between the first fuel source and the second fuel source at which to operate the vehicle system at different locations along the route may be determined. The variable ratio may change based on one or more of the different locations, different times, or different distances along the route.

Optionally, a trip plan may be determined for the vehicle system to move along the route. The trip plan may be based on the variable ratio between the first fuel source and the second fuel source at the different locations along the route.

Optionally, the trip plan for the vehicle system may be determined before the vehicle system starts to move along the route.

Optionally, the trip plan may be modified as the vehicle system moves along the route based on one or more of one or more characteristics of the route, one or more characteristics of the vehicle system, or one or more requirements.

Optionally, the first ratio may be determined based on one or more objectives of a trip in order to control usage of the first fuel source of the vehicle system and to control usage of the second fuel source of the vehicle system during the trip.

Optionally, the first ratio may be determined in order to control usage of the first fuel source and usage of the second fuel source based on one or more characteristics of the route along which the vehicle system moves.

Optionally, one of the first fuel source or the second fuel source may be a carbon-based fuel source, and the other of the first fuel source or the second fuel source may be a non-carbon based fuel source.

Optionally, the second fuel may be one or more of hydrogen or ammonia.

Optionally, determining the first ratio may include controlling an amount of emissions generated by the one or more of the first fuel source or the second fuel source.

Optionally, an efficiency of operating the vehicle system according to the first operational settings may be determined. The vehicle system may operate according to different, second operational settings while the efficiency is maintained.

Optionally, controlling operation of the vehicle system according to the second operational settings may include controlling the vehicle system according to a second ratio between the first fuel source and the second fuel source at a second location along the route.

Optionally, the first operational settings at which to control the vehicle system may be determined prior to the vehicle system starting movement along the route.

Optionally, determining the first ratio may be based at least in part on one or more of achieving a determined carbon content of the combination of the first and second fuels, or achieving a determined carbon content of an exhaust stream of an engine of the vehicle system.

In accordance with one example or aspect, a system may include a controller having one or more processors that may determine a first ratio at which to operate a vehicle system at a first location along a route. The first ratio may be based on an amount of a first fuel of a first fuel source and an amount of a second fuel of a second fuel source. The vehicle system may be powered by one or more of the first fuel source or the second fuel source. The controller may determine first operational settings at which to control the vehicle system based on the first ratio between the first fuel source and the second fuel source at the first location along the route. The controller may communicate a command message to the vehicle system to control operation of the vehicle system according to the first operational settings to move the vehicle system according to the first ratio at the first location along the route.

Optionally, the controller may determine a second ratio between the first fuel source and the second fuel source at which to operate the vehicle system at a second location along the route. The first ratio between the amount of the first fuel of the first fuel source and the amount of the second fuel of the second fuel source may be different than the second ratio between the amount of the first fuel of the first fuel source and the amount of the second fuel of the second fuel source.

Optionally, the vehicle system may include two or more vehicles that may travel together along the route. The first fuel source may be disposed onboard a first vehicle of the vehicle system, and the second fuel source may be disposed onboard a second vehicle of the vehicle system.

Optionally, the controller may determine a variable ratio between the first fuel source and the second fuel source at which to operate the vehicle system at different locations along the route. The variable ratio may change based on one or more of the different locations, different times, or different distances along the route.

Optionally, the controller may determine the first ratio based on one or more objectives of a trip in order to control usage of the first fuel source of the vehicle system and to control usage of the second fuel source of the vehicle system during the trip.

Optionally, the controller may determine the first ratio to control an amount of emissions generated by the one or more of the first fuel source or the second fuel source.

In accordance with one example or aspect, a method may include determining a variable ratio at which to operate a vehicle system at one or more locations along a route. The variable ratio may be based on an amount of a first fuel of a first fuel source relative to an amount of a second fuel of a second fuel source. The vehicle system may be powered by one or more of the first fuel of the first fuel source or the second fuel of the second fuel source. Variable operational settings at which to control the vehicle system may be determined based on the variable ratio at the one or more locations along the route. The vehicle system may be controlled according to first operational settings at a first location of the one or more locations along the route based on a first ratio of the variable ratio between the amount of the first fuel of the first fuel source relative to the amount of the second fuel of the second fuel source. The vehicle system may be controlled according to different, second operational settings at a second location of the one or more locations along the route based on a different, second ratio of the variable ratio between the amount of the first fuel of the first fuel source relative to the amount of the second fuel of the second fuel source. Operation of the vehicle system may be controlled according to the variable operational settings to move the vehicle system according to the variable ratio at the one or more locations along the route.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   determining a first ratio at which to operate a vehicle system at a first location along a route along which the vehicle system moves, the first ratio based on an amount of a first fuel of a first fuel source relative to an amount of a second fuel of a second fuel source, the vehicle system being powered by one or more of the first fuel source or the second fuel source;
   determining first operational settings at which to control the vehicle system based on the first ratio between the first fuel source and the second fuel source at the first location along the route; and
   controlling operation of the vehicle system according to the first operational settings to move the vehicle system according to the first ratio at the first location along the route.

2. The method of claim 1, further comprising:
   determining a second ratio between the first fuel source and the second fuel source at which to operate the vehicle system at a second location along the route, wherein the first ratio between the amount of the first fuel of the first fuel source and the amount of the second fuel of the second fuel source is different than the second ratio between the amount of the first fuel of the first fuel source and the amount of the second fuel of the second fuel source.

3. The method of claim 1, wherein the vehicle system includes two or more vehicles that travel together along the route, wherein the first fuel source is disposed onboard a first vehicle of the vehicle system, and the second fuel source is disposed onboard a second vehicle of the vehicle system.

4. The method of claim 1, further comprising:
   determining a variable ratio between the first fuel source and the second fuel source at which to operate the vehicle system at different locations along the route, the variable ratio configured to change based on one or more of the different locations, different times, or different distances along the route.

5. The method of claim 4, further comprising determining a trip plan for the vehicle system to move along the route, the trip plan based on the variable ratio between the first fuel source and the second fuel source at the different locations along the route.

6. The method of claim 5, further comprising determining the trip plan for the vehicle system prior to the vehicle system starting movement along the route.

7. The method of claim 5, further comprising modifying the trip plan as the vehicle system moves along the route based on one or more of one or more characteristics of the route, one or more characteristics of the vehicle system, or one or more requirements.

8. The method of claim 1, further comprising determining the first ratio based on one or more objectives of a trip in order to control usage of the first fuel source of the vehicle system and to control usage of the second fuel source of the vehicle system during the trip.

9. The method of claim 1, further comprising determining the first ratio in order to control usage of the first fuel source and usage of the second fuel source based on one or more characteristics of the route along which the vehicle system moves.

10. The method of claim 1, wherein one of the first fuel source or the second fuel source is a carbon-based fuel source, and the other of the first fuel source or the second fuel source is a non-carbon based fuel source.

11. The method of claim 1, wherein the second fuel is one or more of hydrogen or ammonia.

12. The method of claim 1, wherein determining the first ratio includes controlling an amount of emissions generated by the one or more of the first fuel source or the second fuel source.

13. The method of claim 12, wherein at least a portion of the emissions generated by the one or more of the first fuel source or the second fuel source includes carbon.

14. The method of claim 1, further comprising:
determining an efficiency of operating the vehicle system according to the first operational settings; and
determining that the vehicle system may operate according to different, second operational settings while the efficiency is maintained.

15. The method of claim 14, wherein controlling operation of the vehicle system according to the second operational settings includes controlling the vehicle system according to a second ratio between the first fuel source and the second fuel source at a second location along the route.

16. The method of claim 1, further comprising determining the first operational settings at which to control the vehicle system prior to the vehicle system starting movement along the route.

17. The method of claim 1, wherein the determining of the first ratio is based at least in part on one or more of achieving a determined carbon content of the combination of the first and second fuels, or achieving a determined carbon content of an exhaust stream of an engine of the vehicle system.

18. A system comprising:
a controller including one or more processors configured to determine a first ratio at which to operate a vehicle system at a first location along a route, the first ratio based on an amount of a first fuel of a first fuel source and an amount of a second fuel of a second fuel source, the vehicle system being powered by one or more of the first fuel source or the second fuel source,
the controller configured to determine first operational settings at which to control the vehicle system based on the first ratio between the first fuel source and the second fuel source at the first location along the route, and
the controller configured to communicate a command message to the vehicle system to control operation of the vehicle system according to the first operational settings to move the vehicle system according to the first ratio at the first location along the route.

19. The system of claim 18, wherein the controller is configured to determine a second ratio between the first fuel source and the second fuel source at which to operate the vehicle system at a second location along the route, wherein the first ratio between the amount of the first fuel of the first fuel source and the amount of the second fuel of the second fuel source is different than the second ratio between the amount of the first fuel of the first fuel source and the amount of the second fuel of the second fuel source.

20. The system of claim 18, wherein the vehicle system includes two or more vehicles that travel together along the route, wherein the first fuel source is disposed onboard a first vehicle of the vehicle system, and the second fuel source is disposed onboard a second vehicle of the vehicle system.

21. The system of claim 18, wherein the controller is configured to determine a variable ratio between the first fuel source and the second fuel source at which to operate the vehicle system at different locations along the route, the variable ratio configured to change based on one or more of the different locations, different times, or different distances along the route.

22. The system of claim 18, wherein the controller is configured to determine the first ratio based on one or more objectives of a trip in order to control usage of the first fuel source of the vehicle system and to control usage of the second fuel source of the vehicle system during the trip.

23. The system of claim 18, wherein the controller is configured to determine the first ratio in order to control usage of the first fuel source and usage of the second fuel source based on one or more characteristics of the route along which the vehicle system moves.

24. The system of claim 18, wherein the controller is configured to determine the first ratio to control an amount of emissions generated by the one or more of the first fuel source or the second fuel source.

25. A method comprising:
determining a variable ratio at which to operate a vehicle system at one or more locations along a route, the variable ratio based on an amount of a first fuel of a first fuel source relative to an amount of a second fuel of a second fuel source, the vehicle system configured to be powered by one or more of the first fuel of the first fuel source or the second fuel of the second fuel source;
determining variable operational settings at which to control the vehicle system based on the variable ratio at the one or more locations along the route, the vehicle system configured to be controlled according to first operational settings at a first location of the one or more locations along the route based on a first ratio of the variable ratio between the amount of the first fuel of the first fuel source relative to the amount of the second fuel of the second fuel source, and the vehicle system configured to be controlled according to different, second operational settings at a second location of the one or more locations along the route based on a different, second ratio of the variable ratio between the amount of the first fuel of the first fuel source relative to the amount of the second fuel of the second fuel source; and
controlling operation of the vehicle system according to the variable operational settings to move the vehicle system according to the variable ratio at the one or more locations along the route.

\* \* \* \* \*